United States Patent
Faroudja et al.

(10) Patent No.: US 9,215,468 B1
(45) Date of Patent: Dec. 15, 2015

(54) VIDEO BIT-RATE REDUCTION SYSTEM AND METHOD UTILIZING A REFERENCE IMAGES MATRIX

(71) Applicant: Faroudja Enterprises, Inc., Los Altos, CA (US)

(72) Inventors: Yves Faroudja, Los Altos, CA (US); Minqiang Jiang, Los Altos, CA (US); Xu Dong, Los Altos, CA (US)

(73) Assignee: Faroudja Enterprises, Inc., Los Altos, CA (US)

(*) Notice: Subject to any disclaimer, the term of this patent is extended or adjusted under 35 U.S.C. 154(b) by 0 days.

(21) Appl. No.: 14/454,647

(22) Filed: Aug. 7, 2014

(51) Int. Cl.
*H04N 19/172* (2014.01)
*H04N 19/146* (2014.01)
*H04N 19/105* (2014.01)
*H04N 19/91* (2014.01)
*H04N 19/46* (2014.01)
*H04N 19/53* (2014.01)

(52) U.S. Cl.
CPC ........... *H04N 19/172* (2014.11); *H04N 19/105* (2014.11); *H04N 19/146* (2014.11); *H04N 19/46* (2014.11); *H04N 19/53* (2014.11); *H04N 19/91* (2014.11)

(58) Field of Classification Search
CPC ..... H04N 19/20; H04N 19/172; H04N 19/46; H04N 19/53
USPC ...................................... 382/233; 375/240.16
See application file for complete search history.

(56) References Cited

U.S. PATENT DOCUMENTS

| | | | | |
|---|---|---|---|---|
| 8,315,310 | B2 * | 11/2012 | Shi | H04N 19/52 348/699 |
| 8,514,940 | B2 * | 8/2013 | Han | H04N 19/567 375/240.16 |
| 8,531,321 | B1 * | 9/2013 | Rossato | H04N 19/46 341/51 |
| 8,620,093 | B2 * | 12/2013 | Nguyen et al. | 382/218 |
| 8,681,873 | B2 * | 3/2014 | Bivolarsky | H04N 19/107 375/240.21 |
| 2012/0069895 | A1 * | 3/2012 | Blum | H04N 19/46 375/240.03 |
| 2012/0201300 | A1 * | 8/2012 | Kim et al. | 375/240.12 |
| 2013/0128966 | A1 * | 5/2013 | Gao et al. | 375/240.12 |
| 2013/0272621 | A1 * | 10/2013 | Lasserre | G06T 9/00 382/233 |
| 2015/0131921 | A1 * | 5/2015 | Huang | 382/233 |

* cited by examiner

*Primary Examiner* — William C Vaughn, Jr.
*Assistant Examiner* — Luis Perez Fuentes
(74) *Attorney, Agent, or Firm* — Invent Capture, LLC.; Samuel S. Cho

(57) ABSTRACT

A video bit-rate reduction system utilizing a reference images matrix and a method of operating the video bit-rate reduction system are disclosed. In one embodiment, the video bit-rate reduction system includes an encoder-side bit-rate reduction system (e.g. a video signal transmitter) with a reference images matrix matchmaker and a decoder-side bit-rate reduction system (e.g. a video signal receiver) with a reference images matrix reconstructor. The video bit-rate reduction system is designed to accommodate a reference images matrix-based symbolization, matchmaking, and reconstruction of residual signals that are processed through a support layer pathway with a high bit-rate reduction and data transmission efficiency, while retaining the high-quality of the video data without any or substantial visible degradation of image and video quality. In a preferred embodiment, a sparse linear model is applied to the reference images matrix matchmaking and the reference images matrix reconstruction for compact symbolization of the residual signals.

20 Claims, 7 Drawing Sheets

100
An Encoder-Side System Block Diagram Utilizing a Reference Images Matrix

Another Encoder-Side System Block Diagram Utilizing a Reference Images Matrix
(Without Main Compression and Decoding for the Residual Signal Generation)

Signal Output Examples from a Non-Linear Enhancement Unit

Signal Output Examples for Residual Signal Generation

600

An Example of Reference Image Elements and Element Indexes in a Reference Images Matrix

700

Patches from an Image

| Patch Number ($x$) | Index | Coefficient ($a$) | Linear Combination Representation |
|---|---|---|---|
| 701 | 1 | 0.5 | 0.5 · (1) |
| 702 | 1, 2 | 0.5, 0.7 | 0.5 · (1) + 0.7 · (2) |
| 703 | 1, 2, 3, 4 | 0.3, 0.3, 0.3, 0.3 | 0.3·(1)+0.3·(2)+0.3·(3)+0.3·(4) |

800

Element Index, Coefficient (Amplitude(s) in each patch), and Linear Combination Representation in a Reference Images Matrix

FIG. 8

VIDEO BIT-RATE REDUCTION SYSTEM AND METHOD UTILIZING A REFERENCE IMAGES MATRIX

FIELD OF THE INVENTION

The present invention generally relates to image and video processing. The present invention also relates to bit-rate reduction of image and video data with separated processing of a main layer and a support layer. More specifically, the present invention relates to utilizing a reference images matrix for video bit-rate reduction in encoding and decoding of video data. Furthermore, the present invention also relates to reference images matrix matchmaking during encoding of bit-rate reduced video data, and reference images matrix reconstruction during decoding of the bit-rate reduced video data. In addition, the present invention also relates to sparse coding as an embodiment of the images matrix matchmaking, and sparse reconstruction as an embodiment of the references images matrix reconstruction.

BACKGROUND OF THE INVENTION

Video data and signals generally require a high amount of bandwidth for communication over a wired and/or wireless data network, or over a direct peer-to-peer connection. Furthermore, increasingly ubiquitous utilizations of high-definition video codec standards for television broadcasts, Internet video broadcasts, Internet video telephony, and other multimedia-related applications are consuming and requiring high bit transfer rates (i.e. large bandwidths) over the wired and/or wireless data network for reliable transmission and display of the video data in real time.

In case of Internet-related video broadcasts and applications, image quality degradations, real-time video playback interruptions, and/or other quality-of-service limitations are common due to the large bandwidth requirements in transferring the video data over the Internet. This is especially true for transmission of high-definition videos. Furthermore, some television and other multimedia broadcasters are no longer satisfied with standard digital television standards, or even with the high-definition television (HDTV) standards (e.g. 1080i and 720p), because they prefer to move to higher scan rates (e.g. "4K," which is approximately 3840×2160 pixels), or higher frame rates (e.g. 120 Hz).

Although various image and video compression standards are attempting to alleviate the high bit-rate requirements of video transmissions by packing an increased data load into increasingly-overworked channels more efficiently, these improvements are still merely gradual and are limited to some newer compression standards.

Therefore, it may be desirable to provide a bit-rate reduction system with a high bit-rate reduction efficiency that can still be utilized for a plurality of existing image and video compression standards, such as JPEG, JPEG2000, MPEG 2/4, h.264, and HEVC, and existing image and video processing equipment, while retaining a high image quality.

It may also be desirable to separate original video data into a main layer processing and a support layer processing within the bit-rate reduction system, so that main layer data and support layer data can be separately processed for a high bit-rate reduction efficiency prior to transmission, while retaining a high image quality upon decoding and combination of the separated video data at a receiving device.

Furthermore, it may also be desirable to incorporate a unique support layer processing method that utilizes a reference images matrix, which simplifies and economizes the support layer data encoding, transmission, and decoding while still retaining a high image quality after the transmission from an encoder-side system to a decoder-side system.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an encoder-side bit-rate reduction system for support layer processing of video data is disclosed. This encoder-side bit-rate reduction system comprises: a decimator that down-converts an original video input with at least one of a horizontal low-pass filter, a vertical low-pass filter, a horizontal pixel count reduction block, and a vertical pixel count reduction block to reduce bit-rates of the original video input; a main compressor that receives a bit-rate reduced output from the decimator and generates a bit-rate reduced and compressed main layer output signal; a decoder in the encoder-side bit-rate reduction system, wherein the decoder receives the bit-rate reduced and compressed main layer output signal from the main compressor, and generates a reconstructed low-resolution video signal (Reconstructed LR); an upconverter and resizer that upconverts and resizes the reconstructed low-resolution video signal as a low-resolution full-size image video signal (Full-size Image with LR); a signal subtractor that subtracts the low-resolution full-size image video signal (Full-size Image with LR) from the original video input to generate a residual signal; and a reference images matrix matchmaker operatively connected to the signal subtractor and a reference images matrix, wherein the reference images matrix matchmaker matches the residual signal with a linear combination of indexed reference image elements from the reference images matrix and symbolizes the residual signal with a mathematical coefficient and one or more reference image element indexes.

Furthermore, in another embodiment of the invention, a decoder-side bit-rate reduction system for support layer processing of video data is disclosed. This decoder-side bit-rate reduction system comprises: a main layer decoder that decodes a main layer input to generate a reconstructed low-resolution video signal (Reconstructed LR); an upconverter and resizer that upconverts and resizes the reconstructed low-resolution video signal as a low-resolution full-size image video signal (Full-size Image with LR); an entropy decoder that decodes a support layer input and generates one or more recovered mathematical coefficients associated with a reference images matrix; a reference images matrix reconstructor operatively connected to the reference images matrix and the entropy decoder, wherein the reference images matrix reconstructor looks up the reference images matrix with the one or more recovered mathematical coefficients from the entropy decoder to generate a reconstructed residual image signal; and a signal adder that adds the reconstructed residual image signal from the reference images matrix reconstructor to the low-resolution full-size image video signal from the upconverter and resizer to generate a reconstructed full image signal.

Moreover, in another embodiment of the invention, a method for utilizing a reference images matrix in a video bit-rate reduction system for support layer processing is disclosed. This method comprises the steps of: receiving a residual signal as an input signal to a reference images matrix matchmaker in an encoder-side bit-rate reduction system, wherein the residual signal is a difference between an original video input and a low-resolution full-size image video signal; matching the residual signal with a linear combination of indexed reference image elements from a reference images matrix operatively connected to the reference images matrix matchmaker; and generating one or more mathematical coefficients to symbolize the residual signal with the linear combination of the indexed reference image elements in the reference images matrix.

BRIEF DESCRIPTION OF DRAWINGS

FIG. 8 shows an example of patch numbers, element indexes, coefficients, and linear combination representations in a reference images matrix utilizing a sparse linear model (i.e. sparse coding), in accordance with an embodiment of the invention.

DETAILED DESCRIPTION

Figure 1:
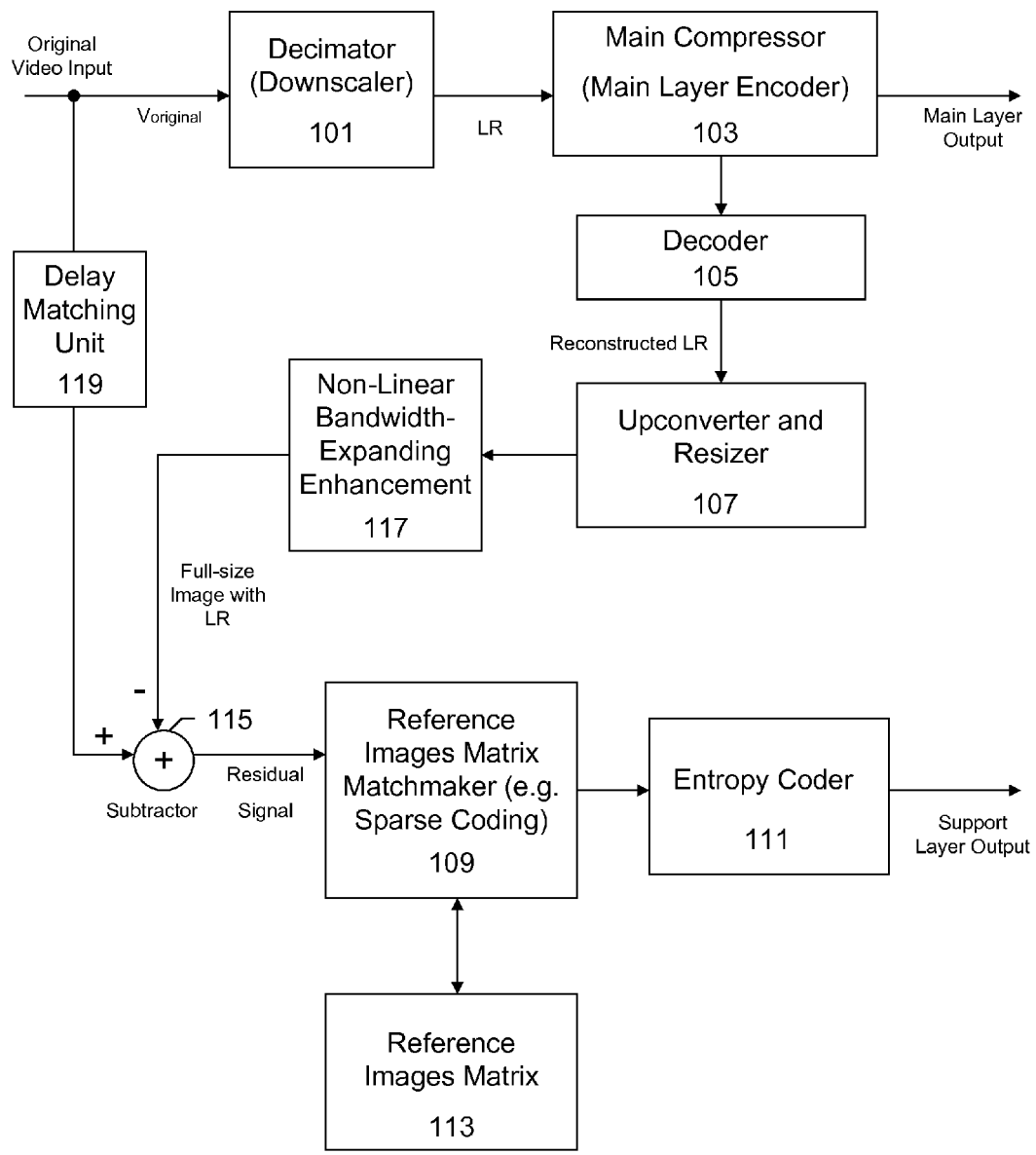
FIG. 1 shows an encoder-side system block diagram utilizing a reference images matrix, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble video and image bit-rate reduction systems and methods that utilize a reference images matrix and a separated main layer and support layer processing. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a term "main layer" is defined as a main pathway of separated video data, wherein the main pathway at a pre-processor stage includes a decimator that includes a horizontal low-pass filter, a vertical low-pass filter, a horizontal pixel count reduction block, and a vertical pixel count reduction block to reduce bit-rates in a main portion of the video data. Then, a main layer encoder (e.g. a main compressor) generates a main layer output for transmission. In a preferred embodiment of the invention, the main layer transmits low-frequency signals after the low-pass filtering, which contains a majority of video information without some potentially important details in repeat patterns, high-frequency signals, and/or computer-generated information such as texts in the video data.

In addition, for the purpose of describing the invention, a term "support layer" is defined as a supporting data pathway of the separated video data, wherein the supporting data pathway at a pre-processor stage and encoding includes a decoder that generates a reconstructed low-resolution (i.e. "Reconstructed LR" in FIG. 1) signal, an upconverter and resizer that generates a low-resolution full-size image signal (i.e. "Full-size Image with LR" in FIG. 1), and a subtractor that subtracts the low-resolution full-size image signal from the original video input signal to generate a residual signal. In a preferred embodiment of the invention, the supporting data pathway at a pre-processor stage and encoding also includes a reference images matrix matchmaker that matches the residual signal with reference image elements from a reference images matrix library, and an entropy coder that generates bit streams as a support layer output.

In one example, the encoder-side and/or decoder-side main layer and support layer processing may be implemented by a software program executed on a programmable device and/or another hardware device, such as a graphics processor unit (GPU), a field programmable gate array (FPGA), a central processing unit (CPU), and a memory unit of a computing device or another electronic device. In another example, the encoder-side and/or decoder-side main layer and support layer processing may be at least partially hardwired and/or embedded codes operating in an application-specific integrated circuit (ASIC), or another semiconductor chip that loads the hardwired and/or embedded codes. ASIC's or other semiconductor chips that hardwire and/or embed the functionality of the support layer processing may be utilized for televisions and other electronic devices.

Furthermore, in one example, an encoder-side bit-rate reduction system (e.g. a video signal transmitter) and/or a decoder-side bit-rate reduction system (e.g. a video signal receiver) may be also implemented by a software program executed on a programmable device and/or another hardware device, such as a graphics processor unit (GPU), a field programmable gate array (FPGA), a central processing unit (CPU), and a memory unit of a computing device or another electronic device. In another example, the encoder-side bit-rate reduction system (e.g. a video signal transmitter) and/or the decoder-side bit-rate reduction system (e.g. a video signal receiver) may be at least partially hardwired and/or embedded codes operating in an application-specific integrated circuit (ASIC), or another semiconductor chip that loads the hardwired and/or embedded codes. ASIC's or other semiconductor chips that hardwire and/or embed the functionality of the encoder-side bit-rate reduction system (e.g. a video signal transmitter) and/or the decoder-side bit-rate reduction system (e.g. a video signal receiver) may be utilized for televisions and other electronic devices.

In addition, for the purpose of describing the invention, a term "reference images matrix" is defined as a library or a dictionary of reference image elements. For example, in a preferred embodiment of the invention, a "reference images matrix" matchmaker in an encoder-side system can map or match a linear combination of reference image elements from the reference images matrix to represent a patch (x) in an image (X), wherein each reference image element is symbolized by an index. Sparse coding or another reference images matrix matchmaking scheme can be utilized for the reference images matrix matchmaker to generate coefficients, which compactly represent the residual signal information for the support layer. Furthermore, in another example, a "reference images matrix" reconstructor in a decoder-side system can reconstruct a residual image with coefficients recovered from an entropy decoder and a low-resolution full-size image from a main layer upconverter and resizer.

In addition, for the purpose of describing the invention, the following symbols and the terms utilized in the figures are defined according to the following descriptions:

$V_{original}$: an original video input.

Reconstructed LR: a reconstructed low-resolution video signal that represents a decoded main layer bit stream.

LR: a low-resolution video signal of an original video input, which has been downscaled in the decimator.

Full-size Image with LR: a low-resolution full-size image video signal, which is upconverted and resized from the Reconstructed LR or the LR.

Residual Signal: the difference between the original video input and the low-resolution full-size image video signal. In general, the residual signal contains lost or missing information that may have been removed from the main layer output due to the main layer's pre-processing, low-pass filtering, and compression.

Main Layer Output: a main layer output bit stream from an encoder-side bit-rate reduction system (e.g. a video signal transmitter), wherein the main layer output bit stream is to be transmitted to a decoder-side bit-rate reduction system (e.g. a video signal receiver).

Support Layer Output: a support layer output bit stream from an encoder-side bit-rate reduction system (e.g. a video signal transmitter), wherein the support layer output bit stream is to be transmitted to a decoder-side bit-rate reduction system (e.g. a video signal receiver).

Main Layer Input: a main layer input bit stream to a decoder-side bit-rate reduction system (e.g. a video signal receiver).

Support Layer Input: a support layer input bit stream to a decoder-side bit-rate reduction system (e.g. a video signal receiver).

Coefficients Recovered: an entropy-decoded support layer signal, which represents one or more coefficients from a reference images matrix matchmaking.

Reconstructed Residual Image: a reconstructed residual signal in a decoder-side bit-rate reduction system (e.g. a video signal receiver).

Reconstructed Full Image: a reconstructed video signal in a decoder-side bit-rate reduction system (e.g. a video signal receiver) that is nearly or fully equivalent to an original video input from an encoder-side bit-rate reduction system (e.g. a video signal transmitter).

Upconverter and Resizer: a logical unit that converts and resizes a lower-resolution video signal to a higher-resolution signal format. Typically, an upconverted signal does not carry as high quality visible images as an original video input, if the original video input is in the higher-resolution signal format.

One aspect of an embodiment of the present invention is providing a bit-rate reduction system with a high bit-rate reduction efficiency that can still be utilized for a plurality of existing image and video compression standards, such as JPEG, JPEG2000, MPEG 2/4, h.264, and HEVC, and existing image and video processing equipment, while retaining a high image quality. Another aspect of an embodiment of the present invention is providing a separate original video data into a main layer processing and a support layer processing within the bit-rate reduction system, so that main layer data and support layer data can be separately processed for a high bit-rate reduction efficiency prior to transmission, while retaining a high image quality upon decoding and combination of the separated video data at a receiving device. Furthermore, another aspect of an embodiment of the present invention is incorporating a unique support layer processing method that utilizes a reference images matrix, which simplifies and economizes the support layer data encoding, transmission, and decoding while still retaining a high-quality of the video data without any or substantial visible degradation of image and video quality.

FIG. 1 shows an encoder-side system block diagram (100) of a video bit-rate reduction system, which utilizes a reference images matrix matchmaker (109) and a reference images matrix (113), in accordance with an embodiment of the invention. As shown in FIG. 1, the encoder-side system block comprises a decimator (101), a main compressor (103), a decoder (105), an upconverter and resizer (107), a subtractor (115), the reference images matrix matchmaker (109), the reference images matrix (113), and an entropy encoder (111). Optionally, in one embodiment of the invention, the encoder-side system block may also include a non-linear bandwidth-expanding enhancement unit (117) and/or a delay matching unit (119).

In a preferred embodiment of the invention, the decimator (101) receives an original video input ($V_{Original}$), and processes the original video input to filter, downscale, and/or reduce a high-frequency portion of the original video input. In one embodiment, the decimator (101) may include a horizontal low-pass filter and a vertical low-pass filter that filter out and/or reduce the high-frequency portion of the original video input for bit-rate reduction in the main layer processing pathway. Furthermore, the decimator (101) may also include a horizontal pixel count reduction unit and a vertical pixel count reduction unit, which reduce and/or downscale horizontal and/or vertical domain pixel counts, for example, by eliminating 1 pixel out of 2 pixels that are horizontally or vertically aligned in sequence. In the preferred embodiment of the invention, the decimator (101) can be configured to reduce horizontal and vertical pixel counts in the video signals. As shown in FIG. 1, the decimator (101) generates a low-resolution video signal (LR) of an original video input, which has been downscaled in the decimator.

The main compressor (103) receives the low-resolution video signal (LR) from the decimator (101) and generates bit-rate reduced and compressed main layer output signals, which are transmitted to a decoder-side system (e.g. a video signal receiver) as the "main layer output" from the encoder-side system block, as shown in FIG. 1. The main compressor (103) also sends the bit-rate reduced and compressed main layer output signals to the decoder (105), which subsequently decompresses and decodes the bit-rate reduced and compressed main layer output signals to generate a reconstructed low-resolution video signal (Reconstructed LR) that represents a decoded main layer output bit stream.

Then, the upconverter and resizer (107) receives, upconverts, and resizes the reconstructed low-resolution video signal (Reconstructed LR) to generate a low-resolution full-size image video signal (Full-size Image with LR). Due to the low-pass filtering, the downscaling, and/or the main compression that were previously performed on the main layer output signal for bit-rate reduction, the low-resolution full-size image video signal (Full-size Image with LR) generated by the upconverter and resizer (107) typically lacks high-frequency and fine details of an original high-resolution image, which were present in the original video input ($V_{Original}$). Optionally, in one embodiment of the invention, the non-linear bandwidth-expanding enhancement unit (117) may be included in the encoder-side system to sharpen, enhance, and increase the bandwidth of the low-resolution full-size image video signal from the upconverter and resizer (107). By increasing the bandwidth of the low-resolution full-size image video signal, the output signal (Full-size Image with LR) of the non-linear bandwidth-expanding enhancement unit (117) can simulate the full bandwidth of the original video input. The sharpened, enhanced, and bandwidth-expanded low-resolution full-size image can reduce the difference between the original video input and the low-resolution full-size image, which in turn can reduce the amount of information needed to be represented as the residual signal in a subsequent support layer processing stage.

Figure 5:
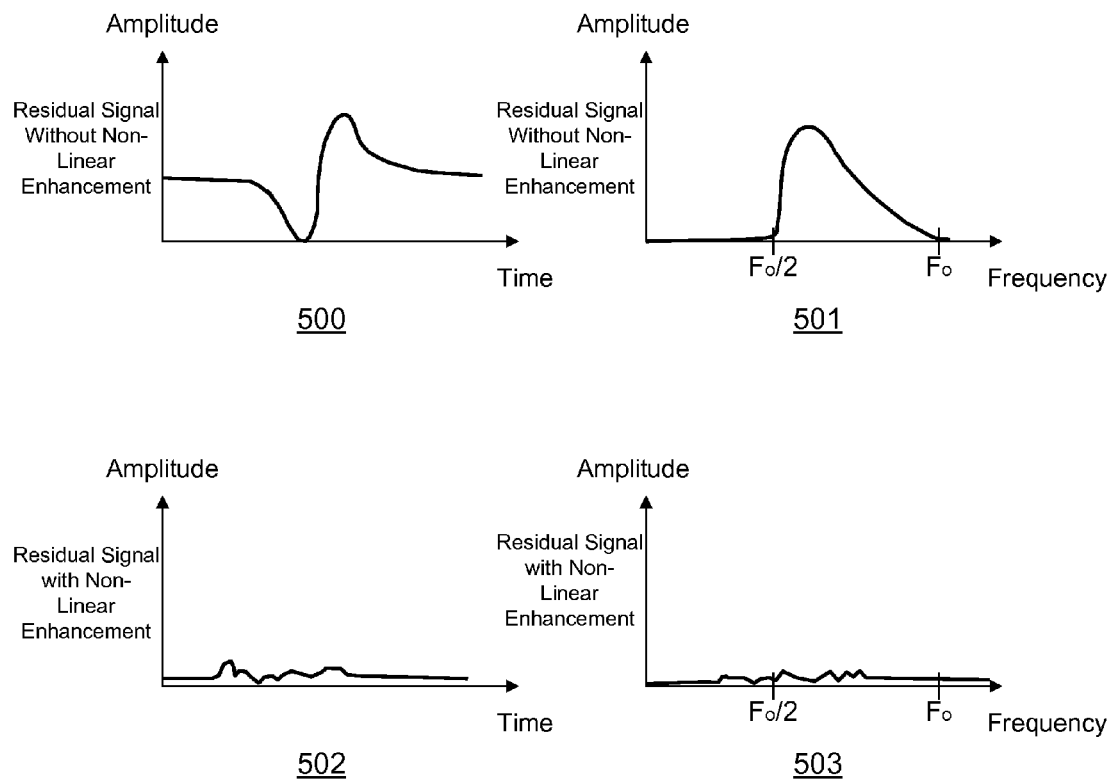
FIG. 5 shows signal output examples for residual signal generation with or without a non-linear bandwidth-expanding enhancement unit, in accordance with an embodiment of the invention.

For example, as shown in a time-domain graph (502) and a frequency-domain graph (503) in FIG. 5 for residual signals with the non-linear bandwidth-expanding enhancement, residual signals generated from the difference between the original video input and the output of the non-linear bandwidth-expanding enhancement unit (e.g. 117) may exhibit "flatter" residual signal amplitudes over time and over signal frequencies, compared to residual signals without the non-linear bandwidth-expanding enhancement, which are also shown in a time-domain graph (500) and a frequency-domain graph (501) in FIG. 5. In this example, the "flatter" residual signal with the non-linear bandwidth-expanding enhancement unit (e.g. 117) suggests that there are less residual information that need to be encoded for the support layer processing. This reduction in the amount of information represented by the residual signal accommodates more efficient support layer processing and bit-rate reduction.

Furthermore, in one embodiment of the invention, the delay matching unit (119) may be located between the original video input ($V_{Original}$) and the subtractor (115) to adjust for undesirable signal processing delays in the signal processing pathways and to synchronize the timing of signal subtractions at the subtractor (115). In another embodiment of the invention, one or more delay matching units may be utilized in other locations of the encoder-side system block (100) for desirable and correct synchronization in the signal processing pathways.

In the preferred embodiment of the invention, the low-resolution full-size image video signal (Full-size Image with LR) is then subtracted from the original video input ($V_{Original}$) in the subtractor (115) in order to produce a residual signal, as shown in FIG. 1. The residual signal is the difference between the original video input and the low-resolution full-size image video signal. In general, the residual signal contains lost or missing information that may have been removed from the main layer output due to the main layer's pre-processing, low-pass filtering, and compression.

Continuing with FIG. 1, the reference images matrix matchmaker (109) then receives the residual signal, and also retrieves reference image element information from the reference images matrix (113) to map, match, and/or estimate best symbolic representation of the residual signal from a linear combination of indexed reference image elements from the reference images matrix (113). In general, the reference images matrix (113) contains a library or a dictionary of reference image elements that can be utilized singularly or in combination to map, match, and/or estimate the best symbolic representation of the residual signal.

In the preferred embodiment of the invention, the reference images matrix matchmaker (109) utilizes the sparse coding based on the sparsity prior, which represents one or more patches (x) in an image (X) as a sparse linear combination in the reference images matrix (113), which is trained from high-resolution patches that were sampled from training of image residuals in accordance with the sparse coding method. The sparse coding is subsequently further described in association with FIGS. 6, 7, and 8. In another embodiment of the invention, another mapping, matching, and/or estimate method other than the sparse coding may be utilized for the reference images matrix matchmaker (109).

As shown in FIG. 1, the preferred embodiment of the invention uniquely maps, matches, and/or estimates best symbolic representation of the residual signal in the reference images matchmaker (109) from a linear combination of the indexed reference image elements in the reference images matrix (113). Because only the residual signal, as opposed to the original video input, undergoes the reference images matrix mapping, matching, and/or estimation, the resulting symbolization and coefficient generation from the reference images matrix matchmaker (109) have significant bit-rate reduction for the support layer processing in the encoder-side system block while retaining the high-frequency and fine details of the original video input, when combined with the bit-rate reduced and compressed main layer output signal in the decoder-side system block.

In the encoder-side system block for the bit-rate reduction system, the reference images matrix matchmaker (109) calculates coefficients that symbolizes certain patches in an image, based on the sparse coding or another mapping, matchmaking, and estimation method. The output coefficients from the reference images matrix matchmaker (109) compactly represent the original video input's high-frequency and fine image details, which were removed from the main layer output and were designed to be carried separately in the support layer pathway in the encoder-side system block of the bit-rate reduction system. The output coefficients from the reference images matrix matchmaker (109) are then encoded by the entropy coder (111), which generates a support layer output prior to transmission of the support layer data to the decoder-side system (e.g. a video signal receiver).

Figure 2:
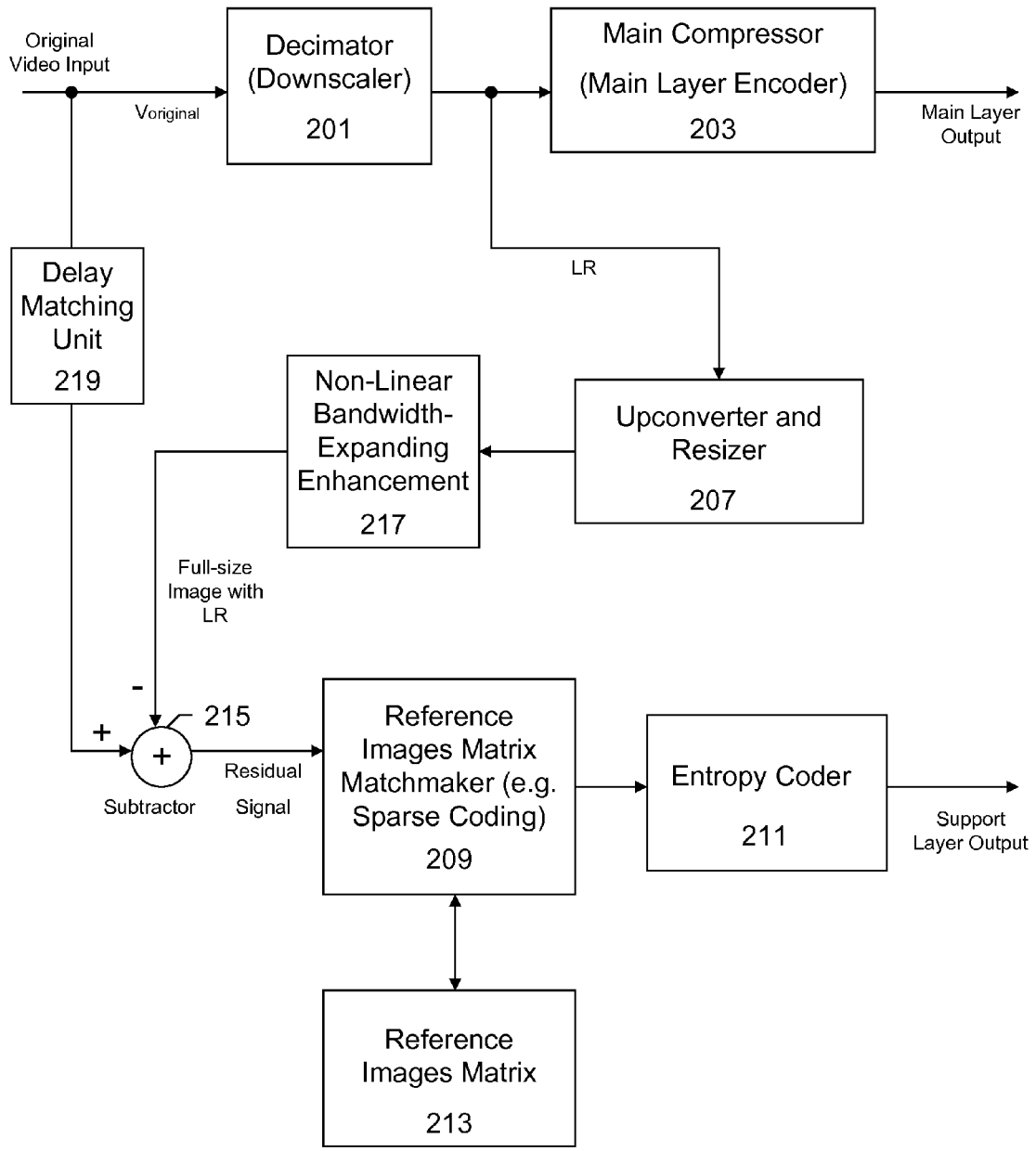
FIG. 2 shows an encoder-side system block diagram utilizing a reference images matrix without main compression and decoding for residual signal generation, in accordance with an embodiment of the invention.

FIG. 2 shows an encoder-side system block diagram (200) utilizing a reference images matrix (209) without main compression and decoding for residual signal generation, in accordance with an embodiment of the invention. In this embodiment of the invention, a main compressor (203) and a corresponding decoder are not utilized for generation of a low-resolution full-size image video signal (Full-size Image with LR), unlike the embodiment of the invention previously described in association with FIG. 1. For certain image and/or video signal formats, such as JPEG's, main compression and subsequent decoding of a downscaled signal may not be necessary for derivation of a residual signal.

As shown in FIG. 2, the encoder-side system block in this embodiment of the invention comprises a decimator (201), a main compressor (203), an upconverter and resizer (207), a subtractor (215), the reference images matrix matchmaker (209), the reference images matrix (213), and an entropy encoder (211). Optionally, in one embodiment of the invention, the encoder-side system block may also include a non-linear bandwidth-expanding enhancement unit (217) and/or a delay matching unit (219).

In one embodiment of the invention, the decimator (201) receives an original video input ($V_{Original}$), and processes the original video input to filter, downscale, and/or reduce a high-frequency portion of the original video input. The decimator (201) may include a horizontal low-pass filter and a vertical low-pass filter that filter out and/or reduce the high-frequency portion of the original video input for bit-rate reduction in the main layer processing pathway. Furthermore, the decimator (201) may also include a horizontal pixel count reduction unit and a vertical pixel count reduction unit, which reduce and/or downscale horizontal and/or vertical domain pixel counts, for example, by eliminating 1 pixel out of 2 pixels that are horizontally or vertically aligned in sequence. In this embodiment of the invention, the decimator (201) can be configured to reduce horizontal and vertical pixel counts in the video signals. As shown in FIG. 2, the decimator (201) generates a low-resolution video signal (LR) of an original video input, which has been downscaled in the decimator.

The main compressor (203) receives the low-resolution video signal (LR) from the decimator (201) and generates bit-rate reduced and compressed main layer output signals, which are transmitted to a decoder-side system (e.g. a video signal receiver) as the "main layer output" from the encoder-side system block, as shown in FIG. 2. Furthermore, the upconverter and resizer (207) receives, upconverts, and resizes the low-resolution video signal (LR) from the decimator (201) to generate a low-resolution full-size image video signal (Full-size Image with LR). Due to the low-pass filtering and the downscaling that were previously performed on the main layer output signal for bit-rate reduction, the low-resolution full-size image video signal (Full-size Image with LR) generated by the upconverter and resizer (207) typically lacks high-frequency and fine details of an original high-resolution image, which were present in the original video input ($V_{Original}$). Optionally, in one embodiment of the invention, the non-linear bandwidth-expanding enhancement unit (217) may be included in the encoder-side system to sharpen, enhance, and increase the bandwidth of the low-resolution full-size image video signal from the upconverter and resizer (207). By increasing the bandwidth of the low-resolution full-size image video signal, the output signal (Full-size Image with LR) of the non-linear bandwidth-expanding enhancement unit (217) can simulate and roughly approximate the full bandwidth of the original video input. The sharpened, enhanced, and bandwidth-expanded low-resolution full-size image can reduce the difference between the original video input and the low-resolution full-size image, which in turn can reduce the amount of information needed to be represented as the residual signal in a subsequent support layer processing stage.

Furthermore, in one embodiment of the invention, the delay matching unit (219) may be located between the original video input ($V_{Original}$) and the subtractor (215) to adjust for undesirable signal processing delays in the signal processing pathways and to synchronize the timing of signal subtractions at the subtractor (215). In another embodiment of the invention, one or more delay matching units may be utilized in other locations of the encoder-side system block (200) for desirable and correct synchronization in the signal processing pathways.

In the preferred embodiment of the invention, the low-resolution full-size image video signal (Full-size Image with LR) is then subtracted from the original video input ($V_{Original}$) in the subtractor (215) in order to produce a residual signal, as shown in FIG. 2. The residual signal is the difference between the original video input and the low-resolution full-size image video signal. In general, the residual signal contains lost or missing information that may have been removed from the main layer output due to the main layer's pre-processing, low-pass filtering, and compression.

Continuing with FIG. 2, the reference images matrix matchmaker (209) then receives the residual signal, and also retrieves reference image element information from the reference images matrix (213) to map, match, and/or estimate best symbolic representation of the residual signal from a linear combination of indexed reference image elements from the reference images matrix (213). In general, the reference images matrix (213) contains a library or a dictionary of reference image elements that can be utilized singularly or in combination to map, match, and/or estimate the best symbolic representation of the residual signal.

In one embodiment of the invention, the reference images matrix matchmaker (209) utilizes the sparse coding based on the sparsity prior, which represents one or more patches (x) in an image (X) as a sparse linear combination in the reference images matrix (213), which is trained from high-resolution patches that were sampled from training of image residuals in accordance with the sparse coding method. The sparse coding is subsequently further described in association with FIGS. 6, 7, and 8. In another embodiment of the invention, another mapping, matching, and/or estimate method other than the sparse coding may be utilized for the reference images matrix matchmaker (209).

As shown in FIG. 2, the preferred embodiment of the invention uniquely maps, matches, and/or estimates best symbolic representation of the residual signal in the reference images matchmaker (209) from a linear combination of the indexed reference image elements in the reference images matrix (213). Because only the residual signal, as opposed to the original video input, undergoes the reference images matrix mapping, matching, and/or estimation, the resulting symbolization and coefficient generation from the reference images matrix matchmaker (209) have significant bit-rate reduction for the support layer processing in the encoder-side system block while retaining the high-frequency and fine details of the original video input, when combined with the bit-rate reduced and compressed main layer output signal in the decoder-side system block.

In the encoder-side system block for the bit-rate reduction system, the reference images matrix matchmaker (209) calculates coefficients that symbolizes certain patches in an image, based on the sparse coding or another mapping, matchmaking, and estimation method. The output coefficients from the reference images matrix matchmaker (209) compactly represent the original video input's high-frequency and fine image details, which were removed from the main layer output and were designed to be carried separately in the support layer pathway in the encoder-side system block of the bit-rate reduction system. The output coefficients from the reference images matrix matchmaker (209) are then encoded by the entropy coder (211), which generates a support layer output prior to transmission of the support layer data to the decoder-side system (e.g. a video signal receiver).

Figure 3:
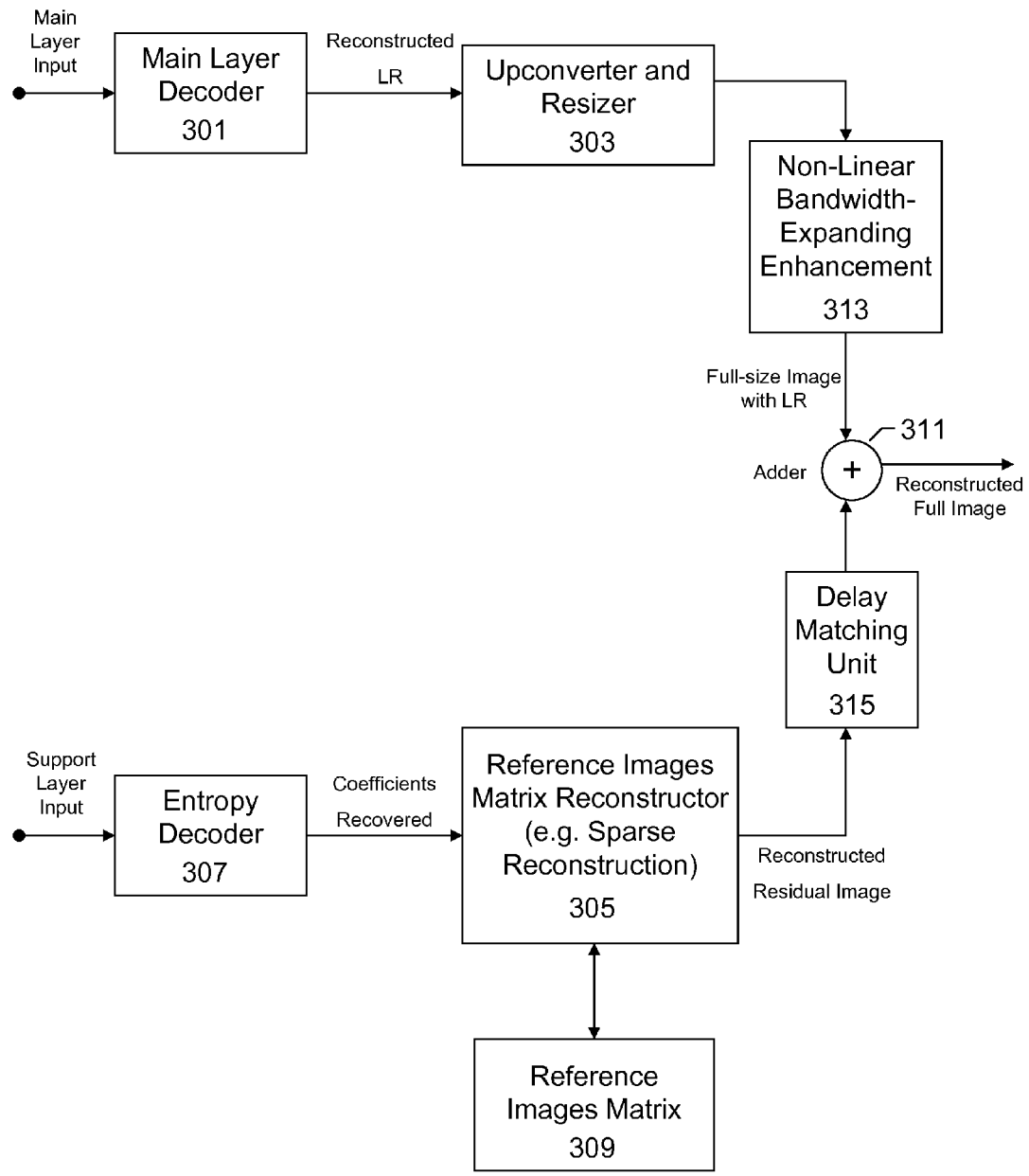
FIG. 3 shows a decoder-side system block diagram utilizing a reference images matrix, in accordance with an embodiment of the invention.

FIG. 3 shows a decoder-side system block diagram (300) of a video bit-rate reduction system, which utilizes a reference images matrix reconstructor (305) and a reference images matrix (309) for reconstruction of a residual image, in accordance with an embodiment of the invention. As shown in FIG. 3, the decoder-side system block comprises a main layer decoder (301), a upconverter and resizer (303), an entropy decoder (307), the reference images matrix reconstructor (305), the reference images matrix (309), and an adder (311). Optionally, in one embodiment of the invention, the decoder-side system block may also include a non-linear bandwidth-expanding enhancement unit (313) and/or a delay matching unit (315).

In a preferred embodiment of the invention, the decoder-side system block is part of a video signal receiver unit that receives main layer input and support layer input signals wirelessly or through a wire connection from an encoder-side system, such as a video signal transmitter. The main layer input in FIG. 3 is a low-pass filtered, downscaled, and/or compressed main layer input bit stream to the main layer decoder (301). The main layer decoder (301) in the decoder-side system block then decodes the main layer input to generate a reconstructed low-resolution video signal (Reconstructed LR) that represents a decoded main layer bit stream. The upconverter and resizer (303) then upconverts and resizes a lower-resolution video signal (Reconstructed LR) to a low-resolution full-size image video signal (Full-size Image with LR), as shown in FIG. 3. Optionally, in one embodiment of the invention, the non-linear bandwidth-expanding enhancement unit (313) may be included in the decoder-side system to sharpen and enhance the low-resolution full-size image video signal from the upconverter and resizer (303). The non-linear bandwidth-expanding enhancement unit (313) may be particularly appropriate in an embodiment of the invention that utilizes a matching non-linear bandwidth-expanding enhancement unit (e.g. 117 of FIG. 1) in the encoder-side system for correct and accurate reconstruction of the reconstructed full image signal from the signal adder (311) in the decoder-side system.

Continuing with FIG. 3, in the preferred embodiment of the invention, the entropy decoder (307) in the decoder-side system receives the support layer input, and recovers coefficients (i.e. "Coefficients Recovered") that were previously entropy-encoded and were associated with the reference images matrix matchmaking from the encoder-side system (e.g. a video signal transmitter). The recovered coefficients (Coefficients Recovered) from the entropy decoder (307) are then sent to the reference images matrix reconstructor (305), as shown in FIG. 3.

Then, in the preferred embodiment of the invention, the reference images matrix reconstructor (305) can generate a reconstructed residual image signal (Reconstructed Residual Image) by looking into and selectively retrieving the contents of the reference images matrix (309) with the coefficients recovered from the entropy decoder (307). Preferably, the contents of the reference images matrix (309) include linear combinations of indexed reference image elements. In one embodiment of the invention, the reference images matrix (309) contains a library or a dictionary of reference image elements that can be retrieved by the reference images matrix reconstructor (305), wherein the library or the dictionary of reference image elements are looked into and selectively retrieved by the recovered coefficients for generating the reconstructed residual image signal (Reconstructed Residual Image). Furthermore, in one embodiment of the invention, sparse coding and sparse reconstruction methods may be utilized for reconstruction of the residual image signal (Reconstructed Residual Image). In another embodiment of the invention, another coding and reconstruction method may be utilized for reconstruction of the residual image signal (Reconstructed Residual Image).

The reconstructed residual image signal (Reconstructed Residual Image) from the reference images matrix reconstructor (305) and the low-resolution full-size image video signal (Full-size Image with LR) from the upconverter and resizer (303) are then added together in the adder (311) to generate a reconstructed video signal (Reconstructed Full Image) in the decoder-side bit-rate reduction system (e.g. a video signal receiver), wherein the reconstructed video signal (Reconstructed Full Image), as the output of the decoder-side bit-rate reduction system, is nearly or fully equivalent to an original video input from the encoder-side bit-rate reduction system (e.g. a video signal transmitter).

As shown in FIG. 3, in one embodiment of the invention, the delay matching unit (315) may be located between the reference images matrix reconstructor (305) and the adder (311) to adjust for undesirable signal processing delays in the signal processing pathways and to synchronize the timing of signal additions at the adder (311). In another embodiment of the invention, one or more delay matching units may be utilized in other locations of the encoder-side system block (300) for desirable and correct synchronization in the signal processing pathways.

Figure 4:
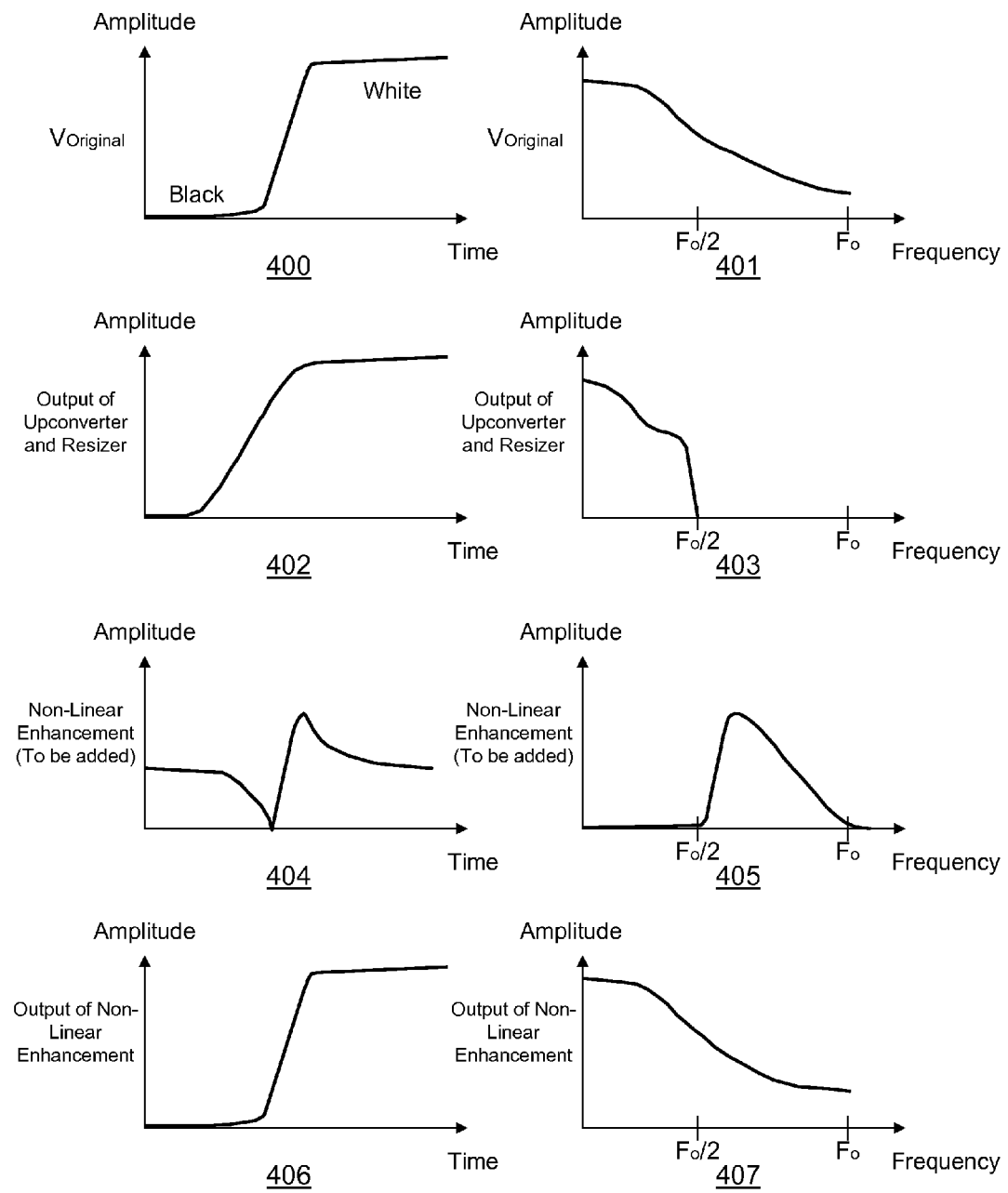
FIG. 4 shows signal output examples associated with a non-linear bandwidth-expanding enhancement unit, in accordance with an embodiment of the invention.

FIG. 4 shows signal output examples associated with a non-linear bandwidth-expanding enhancement unit, in accordance with an embodiment of the invention. A first graph (400) shows an amplitude of a sample original video signal ($V_{Original}$) plotted against time in a time-domain representation. The sample original video signal in the first graph (400) represents a black-to-white transition over time, with the amplitude of the signal rising over time. Furthermore, a second graph (401) shows an amplitude of the sample original video signal ($V_{Original}$) plotted against a range of frequencies in a frequency-domain representation. The sample original video signal in the second graph (401) suggests that the amplitude of the sample original video signal generally declines from a lower signal frequency to a higher signal frequency range, especially above a half point (Fo/2) of a bandwidth limiting frequency towards the bandwidth limiting frequency (Fo).

Moreover, a third graph (402) in FIG. 4. shows an output of an upconverter and resizer (e.g. 107 of FIG. 1, 207 of FIG. 2, 303 of FIG. 3) plotted against time in a time-domain representation. Due to the downscaling and/or the main compression of the sample original video signal in a decimator and/or a main compressor, the output of the upconverter and resizer plotted against time in the third graph (402) may look less crisp and more blunt than the sample original video signal in the first graph (400), which is also represented in time domain. In case of the frequency domain representation as shown in a fourth graph (403) in FIG. 4, signal distortions from the sample original video signal (i.e. the second graph (401)) to the output of the upconverter and resizer (e.g. 107 of FIG. 1, 207 of FIG. 2, 303 of FIG. 3) in frequency domain are more pronounced, with higher-frequency ranges being dramatically cutoff or reduced as a result of going through low-pass filtering in the decimator.

Therefore, in a preferred embodiment of the invention, it is desirable to incorporate a non-linear bandwidth-expanding enhancement unit in a signal processing pathway for a more accurate reconstruction of a low-resolution full-size image video signal that resembles the original video input signal in order to minimize the amount of information that need to be represented by residual signals in a support layer pathway.

A fifth graph (404) in FIG. 4 shows artificial signals generated by a non-linear bandwidth-expanding enhancement unit, wherein the artificial signals are represented in time domain. Similarly, a sixth graph (405) in FIG. 4 shows the artificial signals generated by the non-linear bandwidth-expanding enhancement unit, wherein the artificial signals are represented in frequency domain. In a preferred embodiment of the invention, these artificial signals can be added to the output of the upconverter and resizer in the non-linear bandwidth-expanding enhancement unit to generate a more accurate reconstruction of a low-resolution full-size image video signal that resembles the original video input signal.

As shown in a seventh graph (406) in FIG. 4, the output of the non-linear bandwidth-expanding enhancement unit is represented in time domain. In this example, the profile of the seventh graph (406) closely resembles the profile of the first graph (400) in FIG. 4, thereby suggesting that the output of the non-linear bandwidth-expanding enhancement unit resembles the signal characteristics of the original video signal in time domain more accurately, in contrast to the mere output of the upconverter and resizer as shown in the third graph (402). Similarly, in frequency domain representations, the profile of an eighth graph (407) closely resembles the profile of the second graph (401) in FIG. 4, thereby suggesting that the output of the non-linear bandwidth-expanding enhancement unit resembles the signal characteristics of the original video signal in frequency domain more accurately, in contrast to the mere output of the upconverter and resizer as shown in the fourth graph (403).

FIG. 5 shows signal output examples for residual signal generation with or without a non-linear bandwidth-expanding enhancement unit, in accordance with an embodiment of the invention. A first graph (500) in FIG. 5 represents a residual signal in time domain without the non-linear bandwidth-expanding enhancement. It is clear that there are substantial amount of information in form of signal amplitudes and swings, which need to be represented in the encoding of the residual signal in a support layer processing pathway. Similarly, a second graph (501) in FIG. 5 represents a residual signal in frequency domain without the non-linear bandwidth-expanding enhancement. It is also clear in this frequency domain representation example that there are substantial amount of information in a high frequency range (e.g. between Fo/2 and Fo), which need to be represented in the encoding of the residual signal in the support layer processing pathway.

Any reduction in the amount of information that need to be represented in the encoding of the residual signal can potentially help bit-rate reductions in the support layer processing pathway for the video bit-rate reduction system. As shown in a third graph (502) in FIG. 5, a residual signal in time domain that is generated with the non-linear bandwidth-expanding enhancement has substantially smaller amplitudes and signal swings in its signal characteristics. Likewise, as shown in a fourth graph (503) in FIG. 5, a residual signal in frequency domain that is generated with the non-linear bandwidth-expanding enhancement has substantially smaller amplitudes and signal swings in its signal characteristics.

In particular, the substantial amount of residual information, which were present in the high frequency range in the frequency domain representation of the second graph (501), is now minimized in the fourth graph (503). The signal characteristics of the residual signals with the non-linear bandwidth-expanding enhancement, as shown in the third graph (502) and the fourth graph (503), require substantially less amount of information for residual signal encoding, compared to the signal characteristics of the residual signals without the non-linear bandwidth-expanding enhancement. Therefore, by utilizing the non-linear bandwidth-expanding enhancement, a substantial bit-rate reduction may be achieved for the support layer processing pathway for signal processing and transmission of residual signals.

Figures 6, 7:
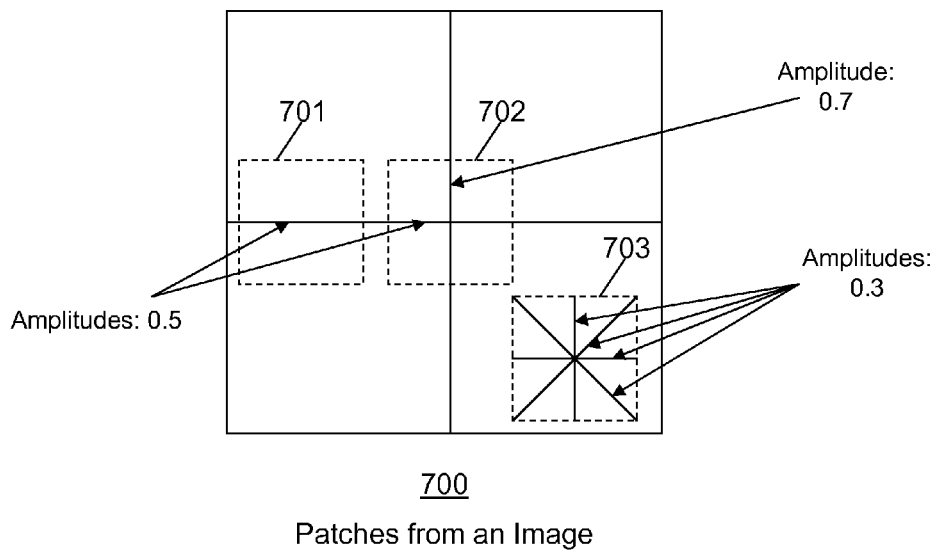
FIG. 6 shows an example of reference image elements and element indexes in a reference images matrix, in accordance with an embodiment of the invention.
FIG. 7 shows patches from an image and one or more amplitudes associated with each patch, in accordance with an embodiment of the invention.

FIG. 6 shows an example (600) of reference image elements and element indexes associated with a reference images matrix, in accordance with an embodiment of the invention. In this example, five reference image elements, numbered from "1" to "5" as element indexes, are shown. For example, Reference Image Element "1" represents a horizontal line, and Reference Image Element "2" represents a vertical line. Furthermore, Reference Image Element "3" represents a lower-left-to-upper-right diagonal line, and Reference Image Element "4" represents an upper-left-to-lower-right diagonal line. In addition, Reference Image Element "5" represents an empty box. Each reference image element is designed to represent a particular graphical feature, which may be mapped, matched, and/or compared against a particular patch in an image for a compact symbolization of the particular patch with one or more reference image elements in the reference images matrix.

Preferably, a reference image element may be utilized singularly or in combination with other reference image elements to best map, match, and/or compare against the particular patch in the image for the compact symbolization of the particular patch. Furthermore, it should be noted that this particular example (600) of reference image elements (Reference Image Element 1~Reference Image Element 5) for the reference images matrix is a conceptually-simplified embodiment of the invention. Thus, an empirical and/or commercial embodiment of reference image elements in a reference images matrix may be more mathematically elaborate and complex for a particular mapping, matching, and/or comparison scheme between the reference images matrix and patches of an image.

Furthermore, as described previously and shown in FIGS. 1-3, in a preferred embodiment of the invention, a reference images matrix contains a dictionary or a library of reference image elements that are retrieved and utilized singularly or in combination to symbolize one or more patches of an image during the reference images matrix matchmaking in an encoder-side system block, and also during the reference images matrix reconstruction in a decoder-side system block. Moreover, the symbolization of one or more patches of the image is typically represented by element indexes and one or more mathematical coefficients that symbolize amplitudes of the one or more patches of the image. The mathematical coefficients are generated by a reference images matrix matchmaker using a sparse coding or another method in an encoder-side system (e.g. a video signal transmitter). Then, the one or more mathematical coefficients are transmitted to a decoder-side system (e.g. a video signal receiver), and subsequently decoded as "recovered" coefficients. The recovered coefficients can then be utilized by a reference images matrix reconstructor in the decoder-side system, which looks up a decoder-side reference images matrix to generate a reconstructed residual image signal. Moreover, in one or more embodiments of the invention, the symbolic matchmaking and the reconstruction of one or more patches of the image are particularly optimized and utilized for bit-rate reduced transmission of residual signals in a support layer processing pathway.

FIG. 7 shows patches (701, 702, 703) from an image (700), and amplitudes associated with the patches that are represented by coefficients. In a reference images matrix utilizing a sparse liner model (i.e. sparse coding), a first patch (701)

containing a horizontal line, with the patch number "701" (x=701) in the image (700), can be symbolized by a coefficient (α) of "0.5," which signifies the amplitude of an image signal associated with the horizontal line. Furthermore, the element index for the first patch (701) is "1," in accordance with the example (600) with reference image elements and their associated element indexes in FIG. 6.

Similarly, a second patch (702) containing a horizontal line and a vertical line to form a "cross" shape, with the patch number "702" (x=702) in the image (700), can be symbolized by a coefficient (α) of "0.5" for the horizontal line and by a coefficient (α) of "0.7" for the vertical line, with each coefficient representing the amplitude of the image signals associated with the horizontal line and the vertical line. Furthermore, a linear combination of Element Index 1 and Element Index 2, in accordance with the example (600) with reference image elements and their associated element indexes in FIG. 6, represents the "cross shape" of the second patch (702).

Likewise, a third patch (703) containing a horizontal line, a vertical line, and two diagonal lines to form an "asterisk" shape with the patch number "703" (x=703) in the image (700), can be symbolized by a coefficient (α) of "0.3" for each line, with each coefficient representing the amplitude of the image signals associated with each line. Moreover, a linear combination of Element Index 1, Element Index 2, Element Index 3, and Element Index 4, in accordance with the example (600) with reference image elements and their associated element indexes in FIG. 6, represents the "asterisk shape" of the third patch (703).

FIG. 8 shows an example (800) of patch numbers, element indexes, coefficients, and linear combination representations in a reference images matrix utilizing a sparse linear model (i.e. sparse coding), in accordance with an embodiment of the invention. This example (800) is a continuation of the example (600) of reference image elements and element indexes in FIG. 6 and the example (700) of the patches of the image in FIG. 7.

As shown in FIG. 8, for the patch number "701," the element index is "1," and the coefficient (α) is 0.5. A linear combination representation for the patch number "701" is "0.5·(1)," as shown in the example (800). Similarly, for the patch number "702," the element indexes are "1" and "2" (i.e. for representing the "cross" shape), and the coefficients (α's) are 0.5 and 0.7, respectively. A linear combination representation for the patch number "702" is "0.5·(1)+0.7·(2)," as shown in the example (800). Likewise, for the patch number "703," the element indexes are "1," "2," "3," and "4" (i.e. for representing the "asterisk" shape) and the coefficient (α) is 0.3 for each element index. A linear combination representation for the patch number "703" is "0.3·(1)+0.3·(2)+0.3·(3)+0.3·(4)," as shown in the example (800).

In a preferred embodiment of the invention, the sparse linear model, also known as the sparse coding, is utilized for the reference images matrix matchmaking and the reference images matrix reconstruction. The sparse linear model is based on the concept of the sparsity prior, which states that one or more patches (x) in a high-resolution image (X) can be represented as a sparse linear combination in a reference images matrix (Dh), which is trained from one or more high-resolution patches sampled from training image residuals. In one embodiment, the sparse linear model can be defined as follows:

$x \approx D_h \alpha$ for some $\alpha \in R^K$ with $\|\alpha\|_0 \gg K$, where α is a mathematical coefficient for a symbolic representation of a patch (x), and where K, is positively or directly proportional to the image quality.

Furthermore, let $x \in R^n$ be a signal.

Also, let $D=[d_1, d_2, \ldots, d_m] \in R^{n \times m}$ be a set of normalized ($d_1^T d_1 = 1$) "basis vectors," which is part of the reference images matrix.

In this embodiment, sparse representation is to find a sparse vector $\alpha \in R^m$, such that $x \approx D\alpha$, where α is regarded as the sparse code.

In one embodiment of the invention, the sparse coding is patch-based, with each residual patch getting singularly coded to obtain its sparse code, which can be found by any existing l0-norm based algorithms such as the orthogonal matching pursuit (OMP). Moreover, the sparse code can be reconstructed in a decoder-side system with an entropy decoder, and each reconstructed residual patch can be equal to $D\alpha$ (i.e. an approximated matching and recovery for the representation of the patch (x)).

Furthermore, in one embodiment of the invention, an entropy coding in an encoder-side bit-rate reduction system (e.g. a video signal transmitter) can generate a support layer output bit stream in the following steps:

Step 1: Converting sparse codes from double values to integer values by right-shift n bits (e.g. 8 bits; taking integer parts).

Step 2: Generating a bitmap of each spare code by setting zero and setting one for each zero entry and non-zero entry, respectively.

Step 3: The bitmap in Step 2 is entropy-coded into the support layer output bit stream.

Step 4: The set of non-zero entries of each sparse code is also entropy-coded into the support layer output bit stream.

Moreover, in one embodiment of the invention, an entropy decoding in a decoder-side bit-rate reduction system (e.g. a video signal receiver) is generally a reverse procedure of the entropy coding. The entropy decoding decodes the bitmaps and non-zero entries, and then a sparse code associated with each patch can be recovered by the entropy decoder by the following steps:

Step 1: Decoding the bitmap from the support layer output bit stream.

Step 2: Decoding non-zero entries from the support layer output bit stream.

Step 3: Left-shifting n bits of the decoded non-zero entries (e.g. 8 bits).

Step 4: Generating each sparse code by the bitmap and the decoded non-zero entries.

Furthermore, in one embodiment of the invention, a reference images matrix (Dh) is pre-trained prior to transmission of video signals from an encoder-side bit-rate reduction system to a decoder-side bit-rate reduction system, so that the reference images matrix (Dh) is available at both sides. The pre-training of the reference images matrix (Dh) may involve the following steps:

Step 1: Collecting a set of high-resolution training images.

Step 2: Down-converting and/or resizing each high-resolution training image to a low-resolution image with a scalar factor, s.

Step 3: Up-converting and/or resizing each low-resolution image to the size of a corresponding high-resolution image.

Step 4: Generating a residual image, which is the difference of an original high-resolution image and a corresponding up-converted low-resolution image generated in Step 3.

Step 5: Collecting patches (x) from the residual image with size p and the limitation of p>s*s.

Step 6: Applying 10-norm sparse coding (e.g. K-SVD) to the patches (x) to produce the reference images matrix (Dh), which are sparsely represented.

Various embodiments of the invention of have been described above and also illustrated in part by FIGS. 1~8. The present invention provides several advantages over conventional Laplacian pyramid video encoding schemes, other conventional scalable video encoding schemes, and conventional video data processing systems. In particular, unlike conventional Laplacian pyramid video encoding schemes, other conventional scalable video encoding schemes, and conventional video data processing systems, incorporation of a reference images matrix matchmaker in an encoder-side system, a reference images matrix reconstructor in a decoder-side system, and a reference images matrix for support layer processing in accordance with various embodiments of the present invention provides uniquely novel advantages.

For example, the utilization of the reference images matrix in the support layer processing simplifies and economizes the design costs and complexities associated with the encoder-side system and the decoder-side system. Furthermore, the utilization of the reference images matrix in the support layer processing also further reduces video transmission and reception bit rates, compared to conventional scalable video encoding schemes and other conventional video data processing systems, while retaining the high-quality of the video data without any or substantial visible degradation of image and video quality.

Moreover, the utilization of the reference images matrix in the support layer processing can be easily and conveniently adapted and integrated into existing video processing systems, thereby broadening the utility of the video bit-rate reduction system in accordance with various embodiments of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An encoder-side bit-rate reduction system for support layer processing of video data, the encoder-side bit-rate reduction system comprising:
    a decimator that down-converts an original video input with at least one of a horizontal low-pass filter, a vertical low-pass filter, a horizontal pixel count reduction block, and a vertical pixel count reduction block to reduce bit-rates of the original video input;
    a main compressor that receives a bit-rate reduced output from the decimator and generates a bit-rate reduced and compressed main layer output signal;
    an upconverter and resizer that upconverts and resizes the bit-rate reduced output from the decimator or a reconstructed low-resolution video signal (Reconstructed LR) from a decoder that receives the bit-rate reduced and compressed main layer output signal from the main compressor,
    wherein the upconverter and resizer generates a low-resolution full-size image video signal (Full-size Image with LR);
    a signal subtractor that subtracts the low-resolution full-size image video signal (Full-size Image with LR) from the original video input to generate a residual signal;
    a reference images matrix containing a static library of reference image elements and reference image element indexes that are independent of frame contents processed by the encoder-side bit-rate reduction system; and
    a reference images matrix matchmaker operatively connected to the signal subtractor and the reference images matrix,
    wherein the reference images matrix matchmaker matches the residual signal with a linear combination of indexed reference image elements from the reference images matrix and symbolizes the residual signal with a mathematical coefficient and one or more reference image element indexes.

2. The encoder-side bit-rate reduction system of claim 1, further comprising an entropy coder operatively connected to the reference images matrix matchmaker, wherein the entropy coder encodes a support layer output prior to transmission of the support layer output to a decoder-side bit-rate reduction system.

3. The encoder-side bit-rate reduction system of claim 1, wherein the reference images matrix matchmaker and the reference images matrix utilizes a sparse linear model and a sparse coding for symbolizing the residual signal with the mathematical coefficient.

4. The encoder-side bit-rate reduction system of claim 3, wherein the sparse linear model and the sparse coding represent a patch of an image with the mathematical coefficient corresponding to one or more reference image elements in the reference images matrix.

5. The encoder-side bit-rate reduction system of claim 1, wherein at least one of the decimator, the main compressor, the decoder in the encoder-side bit-rate reduction system, the upconverter and resizer, the signal subtractor, and the reference images matrix matchmaker is executed in a graphics processor unit (GPU), a field programmable gate array (FPGA), a central processing unit (CPU), an application-specific integrated circuit (ASIC), or another hardware device.

6. The encoder-side bit-rate reduction system of claim 1, further comprising a non-linear bandwidth-expanding enhancement unit operatively connected to the upconverter and resizer, wherein the non-linear bandwidth-expanding enhancement unit sharpens and increases a bandwidth of the low-resolution full-size image video signal, which results in reduced bits for the residual signal.

7. The encoder-side bit-rate reduction system of claim 1, wherein the upconverter and resizer utilizes a diagonal interpolation.

8. A decoder-side bit-rate reduction system for support layer processing of video data, the decoder-side bit-rate reduction system comprising:
    a main layer decoder that decodes a main layer input to generate a reconstructed low-resolution video signal (Reconstructed LR);
    an upconverter and resizer that upconverts and resizes the reconstructed low-resolution video signal as a low-resolution full-size image video signal (Full-size Image with LR);
    a reference images matrix containing a static library of reference image elements and reference image element indexes that are independent of frame contents processed by an encoder-side bit-rate reduction system;
    an entropy decoder that decodes a support layer input and generates one or more recovered mathematical coefficients associated with the reference images matrix;
    a reference images matrix reconstructor operatively connected to the reference images matrix and the entropy decoder, wherein the reference images matrix reconstructor looks up the reference images matrix with the one or more recovered mathematical coefficients from the entropy decoder to generate a reconstructed residual image signal; and a signal adder that adds the reconstructed residual image signal from the reference images matrix reconstructor to the low-resolution full-size image video signal from the upconverter and resizer to generate a reconstructed full image signal.

9. The decoder-side bit-rate reduction system of claim 8, wherein the reference images matrix reconstructor and the reference images matrix utilizes a sparse linear model and a sparse reconstruction for generating the reconstructed residual image signal with the one or more recovered mathematical coefficients.

10. The decoder-side bit-rate reduction system of claim 9, wherein the sparse linear model and the sparse reconstruction correlate the one or more recovered mathematical coefficients corresponding to one or more reference image elements in the reference images matrix with a patch of an image in generating the reconstructed residual image signal.

11. The decoder-side bit-rate reduction system of claim 8, wherein at least one of the main layer decoder, the upconverter and resizer, the entropy decoder, the reference images matrix reconstructor, and the signal adder is executed in a graphics processor unit (GPU), a field programmable gate array (FPGA), a central processing unit (CPU), an application-specific integrated circuit (ASIC), or another hardware device.

12. The decoder-side bit-rate reduction system of claim 8, further comprising a non-linear bandwidth-expanding enhancement unit operatively connected to the upconverter and resizer, wherein the non-linear bandwidth-expanding enhancement unit sharpens and increases the bandwidth of the low-resolution full-size image video signal.

13. The decoder-side bit-rate reduction system of claim 8, wherein the upconverter and resizer utilizes a diagonal interpolation.

14. A method for utilizing a reference images matrix in a video bit-rate reduction system for support layer processing, the method comprising the steps of:

a decimator that down-converts an original video input with at least one of a horizontal low-pass filter, a vertical low-pass filter, a horizontal pixel count reduction block, and a vertical pixel count reduction block to reduce bit-rates of the original video input;

a main compressor that receives a bit-rate reduced output from the decimator and generates a bit-rate reduced and compressed main layer output signal;

an upconverter and resizer that upconverts and resizes the bit-rate reduced output from the decimator or a reconstructed low-resolution video signal (Reconstructed LR) from a decoder that receives the bit-rate reduced and compressed main layer output signal from the main compressor, receiving a residual signal as an input signal to a reference images matrix matchmaker in an encoder-side bit-rate reduction system, wherein the residual signal is a difference between an original video input and a low-resolution full-size image video signal;

matching the residual signal with a linear combination of indexed reference image elements from a reference images matrix operatively connected to the reference images matrix matchmaker, wherein the reference images matrix contains a static library of reference image elements and reference image element indexes that are independent of frame contents processed by the encoder-side bit-rate reduction system; and generating one or more mathematical coefficients to symbolize the residual signal with the linear combination of the indexed reference image elements in the reference images matrix.

15. The method of claim 14, further comprising the steps of:

recovering the one or more mathematical coefficients with an entropy decoder in a decoder-side bit-rate reduction system; and generating a reconstructed residual image signal from a reference images matrix reconstructor in the decoder-side bit-rate reduction system by looking up the reference images matrix to correlate and recover the reconstructed residual image with the one or more mathematical coefficients recovered in the decoder-side bit-rate reduction system.

16. The method of claim 14, wherein the reference images matrix matchmaker and the reference images matrix utilize a sparse linear model and a sparse coding for symbolizing the residual signal with the one or more mathematical coefficients.

17. The method of claim 16, wherein the sparse linear model and the sparse coding represent a patch of an image with the one or more mathematical coefficients corresponding to one or more reference image elements in the reference images matrix.

18. The method of claim 15, wherein the reference images matrix reconstructor and the reference images matrix utilize a sparse linear model and a sparse reconstruction for generating the reconstructed residual image signal with the one or more mathematical coefficients recovered in the decoder-side bit-rate reduction system.

19. The method of claim 18, wherein the sparse linear model and the sparse reconstruction correlate the one or more mathematical coefficients corresponding to one or more reference image elements in the reference images matrix with a patch of an image in generating the reconstructed residual image signal.

20. The method of claim 14, wherein the video bit-rate reduction system for support layer processing is executed in a graphics processor unit (GPU), a field programmable gate array (FPGA), a central processing unit (CPU), an application-specific integrated circuit (ASIC), or another hardware device.

* * * * *